US012699838B2

(12) United States Patent
Muyal et al.

(10) Patent No.: US 12,699,838 B2
(45) Date of Patent: Aug. 4, 2026

(54) GENERATIVE ARTIFICIAL INTELLIGENCE RESPONSE CACHING USING PROMPT PROCESSING UNITS

(71) Applicant: Cisco Technology, Inc., San Jose, CA (US)

(72) Inventors: Hervé Muyal, Gland (CH); Chiara Troiani, Cheseaux-sur-Lausanne (CH); Franck Bachet, Breval (FR); Marcelo Yannuzzi, Nuvilly (CH); Benjamin William Ryder, Lausanne (CH); Jean Andrei Diaconu, Gaillard (FR)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 18/606,177

(22) Filed: Mar. 15, 2024

(65) Prior Publication Data

US 2025/0292015 A1 Sep. 18, 2025

(51) Int. Cl.
*G06F 40/20* (2020.01)
*G06F 12/0871* (2016.01)
(52) U.S. Cl.
CPC .......... G06F 40/20 (2020.01); G06F 12/0871 (2013.01)
(58) Field of Classification Search
CPC .......... G06F 40/10; G06F 40/20; G06F 40/30; G06F 40/40
See application file for complete search history.

(56) References Cited

U.S. PATENT DOCUMENTS

| | | | |
|---|---|---|---|
| 10,867,005 B1 | 12/2020 | Villiers et al. | |
| 2012/0191860 A1 | 7/2012 | Traversat et al. | |
| 2017/0132141 A1 | 5/2017 | Allen et al. | |
| 2019/0327637 A1 | 10/2019 | Luna et al. | |
| 2019/0354528 A1* | 11/2019 | Demazeau | G06F 16/24552 |
| 2023/0044734 A1* | 2/2023 | Das | H04N 21/4781 |
| 2023/0276096 A1 | 8/2023 | Yoshizawa et al. | |
| 2023/0401541 A1* | 12/2023 | Housseini | G06Q 10/06314 |
| 2025/0068689 A1* | 2/2025 | Zhang | G06F 16/9538 |
| 2025/0104693 A1* | 3/2025 | Papayiannis | G10L 13/10 |
| 2025/0139160 A1* | 5/2025 | Miller | H04N 21/251 |

OTHER PUBLICATIONS

AI Agent: "AI Agents: Power Up Your Productivity", Supercharge Your Workflows with AI, retrieved from https://aiagent.app/ on Feb. 14, 2024, 10 Pages.

(Continued)

*Primary Examiner* — Daniel C Washburn
*Assistant Examiner* — Paul J. Mueller
(74) *Attorney, Agent, or Firm* — Merchant & Gould P.C.; Kenneth J. Heywood

(57) ABSTRACT

In one implementation, a method is disclosed comprising providing a prompt to a large language model to perform a task; determining a likelihood of an outcome of the task changing over a period of time; storing the prompt and the outcome in a cache when the likelihood indicates that the outcome of the task is unlikely to change over the period of time; and returning the outcome from the cache in response to a subsequent prompt asking the large language model to perform the task, in lieu of providing the subsequent prompt to the large language model.

20 Claims, 11 Drawing Sheets

(56) References Cited

OTHER PUBLICATIONS

Gao T., et al., "SimCSE: Simple Contrastive Learning of Sentence Embeddings", arXiv:2104.08821v4 [cs.CL], May 18, 2022, 17 Pages.

Hong S., et al., "MetaGPT: Meta Programming for a Multi-Agent Collaborative Framework", arXiv:2308.00352v5 [cs.AI], Nov. 6, 2023, pp. 1-26.

Mittal A., "MetaGPT: Complete Guide to the Best AI Agent Available Right Now", Unite.AI, Sep. 11, 2023, retrieved from https://www.unite.ai/metagpt-complete-guide-to-the-best-ai-agent-available-right-now/ on Feb. 14, 2024, 9 Pages.

Moons B., et al., "Decoding Transformers on Edge Devices", Axelera AI, retrived from https://www.axelera.ai/decoding-transformers-on-edge-devices/ on Feb. 14, 2024, 17 Pages.

REWORKD: "AgentGPT", retrieved from https://agentgpt.reworkd.ai/ on Feb. 14, 2024, 1 Page.

SHEETGPT: "SheetGPT Performance Optimizations and Caching", Apr. 18, 2023, retrieved from https://sheetgpt.ai/articles/sheetgpt-performance-optimizations-and-caching on Feb. 14, 2024, 4 pages.

Xu M., et al., "Joint Foundation Model Caching and Inference of Generative AI Services for Edge Intelligence", arXiv:2305.12130v1 [cs.NI], May 20, 2023, 6 Pages.

* cited by examiner

300

600

Public or Finetuned Models
And Agents Offered Or
Hosted by A Third-Party
632

APIs
634

Tool To
Execute Task 1
636-1

Tool To
Execute Task n
636-N

638

From
624 of

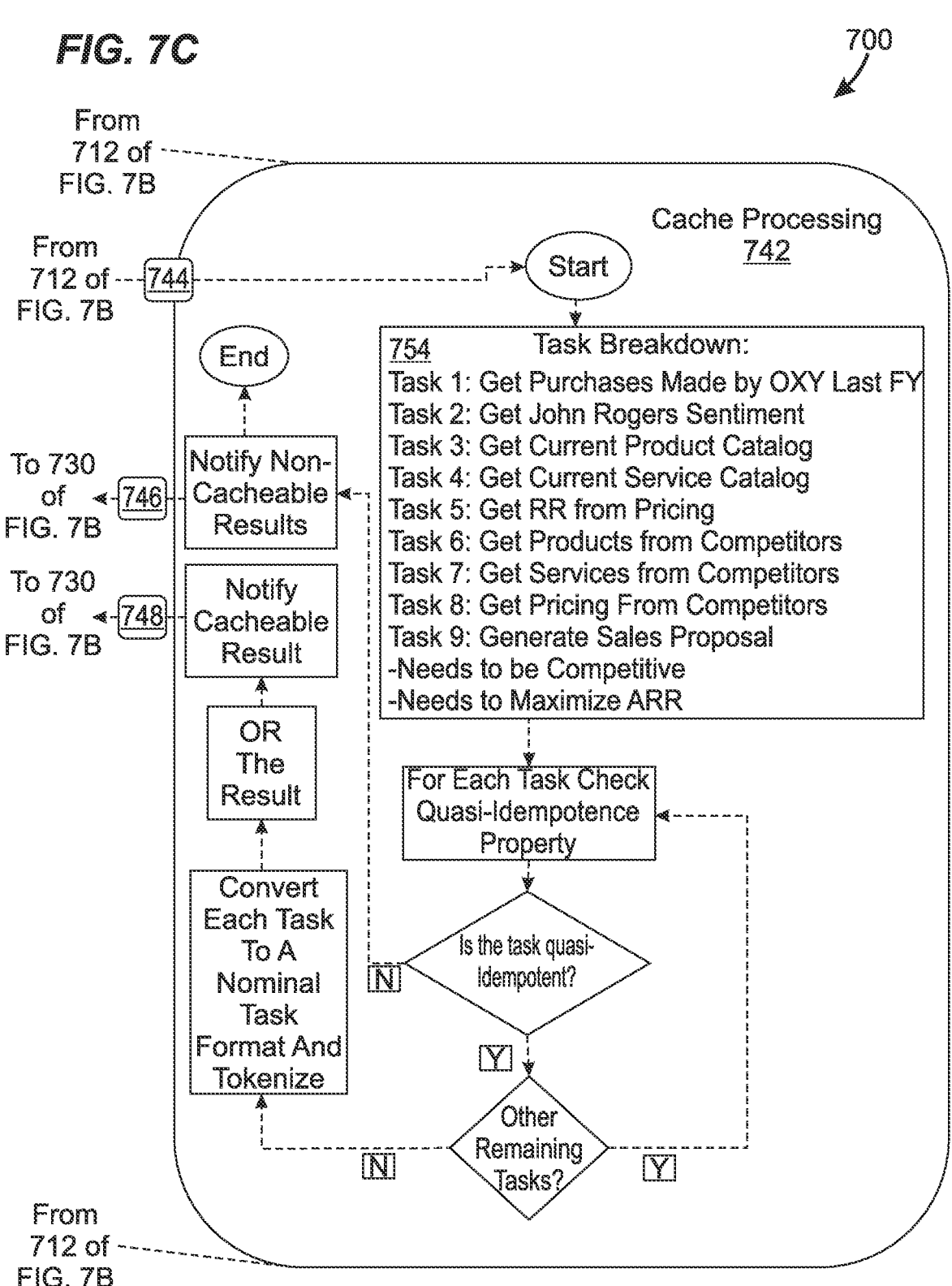

From
712 of
FIG. 7B

From
712 of — [744]
FIG. 7B

Cache Processing
742

Start

End

To 730
of ◄ [746]
FIG. 7B

Notify Non-
Cacheable
Results

To 730
of ◄ [748]
FIG. 7B

Notify
Cacheable
Result

OR
The
Result

Convert
Each Task
To A
Nominal
Task
Format And
Tokenize

754     Task Breakdown:
Task 1: Get Purchases Made by OXY Last FY
Task 2: Get John Rogers Sentiment
Task 3: Get Current Product Catalog
Task 4: Get Current Service Catalog
Task 5: Get RR from Pricing
Task 6: Get Products from Competitors
Task 7: Get Services from Competitors
Task 8: Get Pricing From Competitors
Task 9: Generate Sales Proposal
-Needs to be Competitive
-Needs to Maximize ARR For Each Task Check
Quasi-Idempotence
Property Is the task quasi-
Idempotent?

[N]

[Y]

Other
Remaining
Tasks?

[N]

[Y]

From
712 of
FIG. 7B

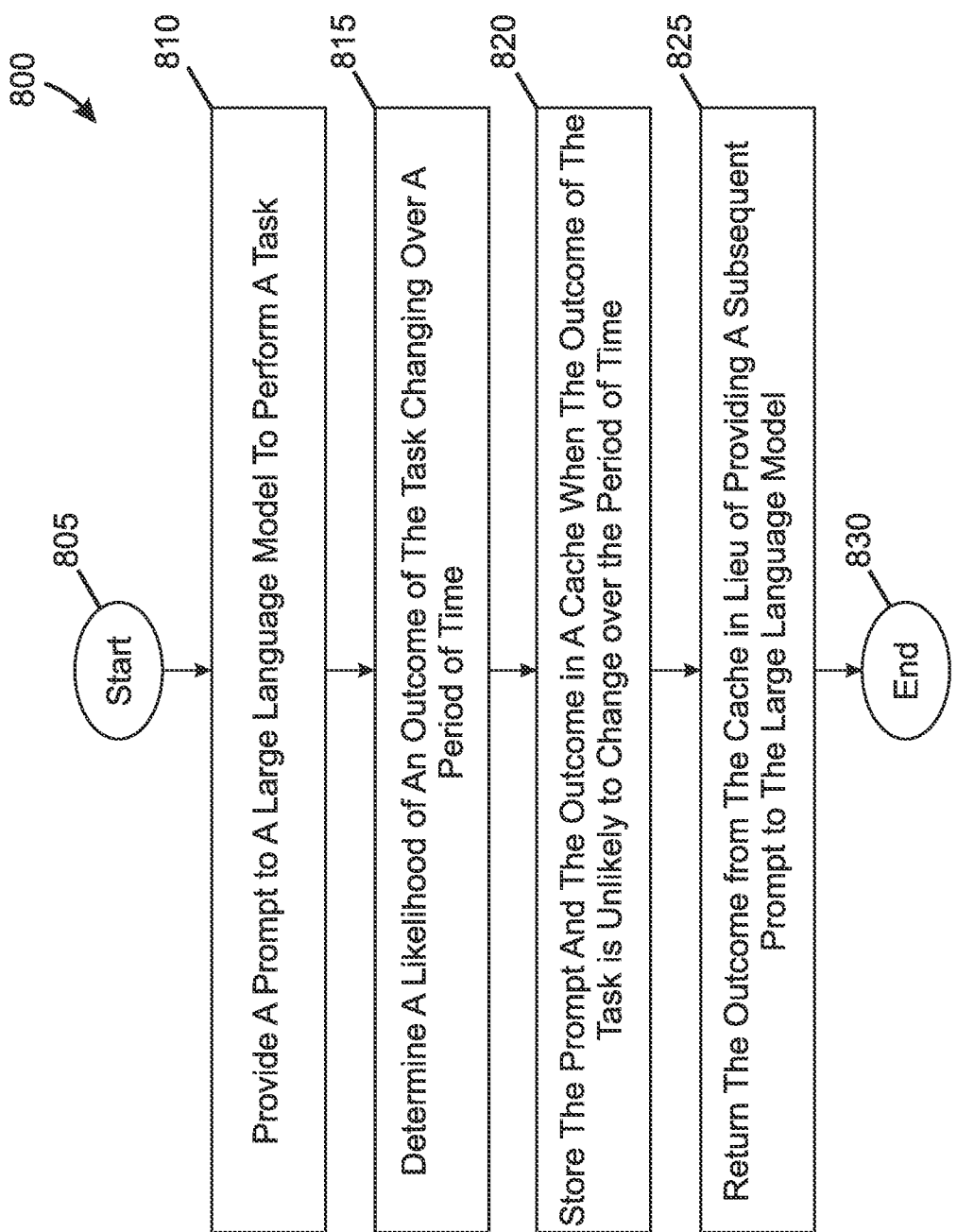

805 — Start

810 — Provide A Prompt to A Large Language Model To Perform A Task

815 — Determine A Likelihood of An Outcome of The Task Changing Over A Period of Time 820 — Store The Prompt And The Outcome in A Cache When The Outcome of The Task is Unlikely to Change over the Period of Time 825 — Return The Outcome from The Cache in Lieu of Providing A Subsequent Prompt to The Large Language Model 830 — End

GENERATIVE ARTIFICIAL INTELLIGENCE RESPONSE CACHING USING PROMPT PROCESSING UNITS

TECHNICAL FIELD

The present disclosure relates generally to computer networks, and, more particularly, to generative artificial intelligence (AI) response caching using prompt processing units.

BACKGROUND

Although many enterprises aim to use generative artificial intelligence (AI) more in the near future, concerns remain regarding the resource consumption associated with using a generative model. Indeed, invoking any generative AI model, such as a large language model (LLM), can be a resource intensive and computationally-costly endeavor. More specifically, each call to complete a prompt can implicate the assessment of massive data sets and can contribute to rapidly compounding resource utilization.

Techniques such as caching can help to shorten data retrieval times and attenuate resource demand. Generally, these approaches operate by caching prompts that were previously issued to a generative AI model and their corresponding answers from that model. Then, in lieu of sending a new prompt to the model for processing, the caching mechanism may first attempt to match that prompt to a previously-issued one and return the cached answer associated with that prompt, if available.

However, caching today typically relies on measuring the semantic similarity between prompts and does so without any true understanding of the nature of the input prompt (e.g., its requested subtasks, etc.). Even minor syntactical variations to a prompt, such as adding a comma or a semicolon, may lead to cache misses or erroneous hits. Consequently, even with a caching mechanism in place, the system may still needlessly consume additional resources.

BRIEF DESCRIPTION OF THE DRA WINGS

The implementations herein may be better understood by referring to the following description in conjunction with the accompanying drawings in which like reference numerals indicate identically or functionally similar elements, of which:

FIGS. 7A-7C illustrate an example of a caching management system leveraging prompt characterizations by a PPU to manage response caching; and FIG. 8 illustrates an example of a simplified procedure for generative AI response caching using PPUs in accordance with one or more implementations described herein.

DESCRIPTION OF EXAMPLE IMPLEMENTATIONS

Overview

According to one or more implementations of the disclosure, a device may provide a prompt to a large language model to perform a task. The device may determine a likelihood of an outcome of the task changing over a period of time. The device may store the prompt and the outcome in a cache when the likelihood indicates that the outcome of the task is unlikely to change over the period of time. The device may return the outcome from the cache in response to a subsequent prompt asking the large language model to perform the task, in lieu of providing the subsequent prompt to the large language model.

Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
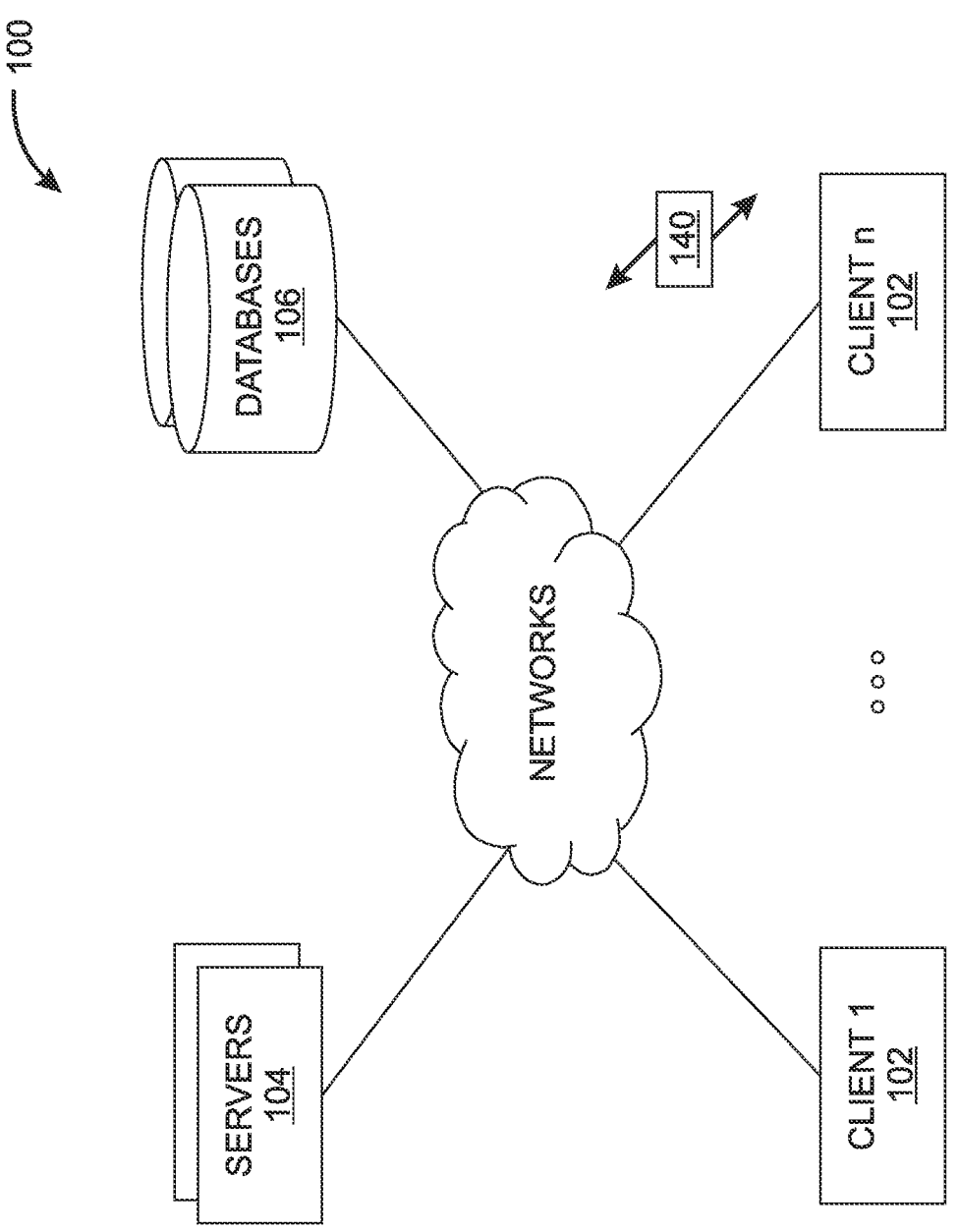
FIG. 1 illustrates an example computing system.

FIG. 1 is a schematic block diagram of an example simplified computing system (e.g., computing system 100) illustratively comprising any number of client devices (e.g., client devices 102 (e.g., a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
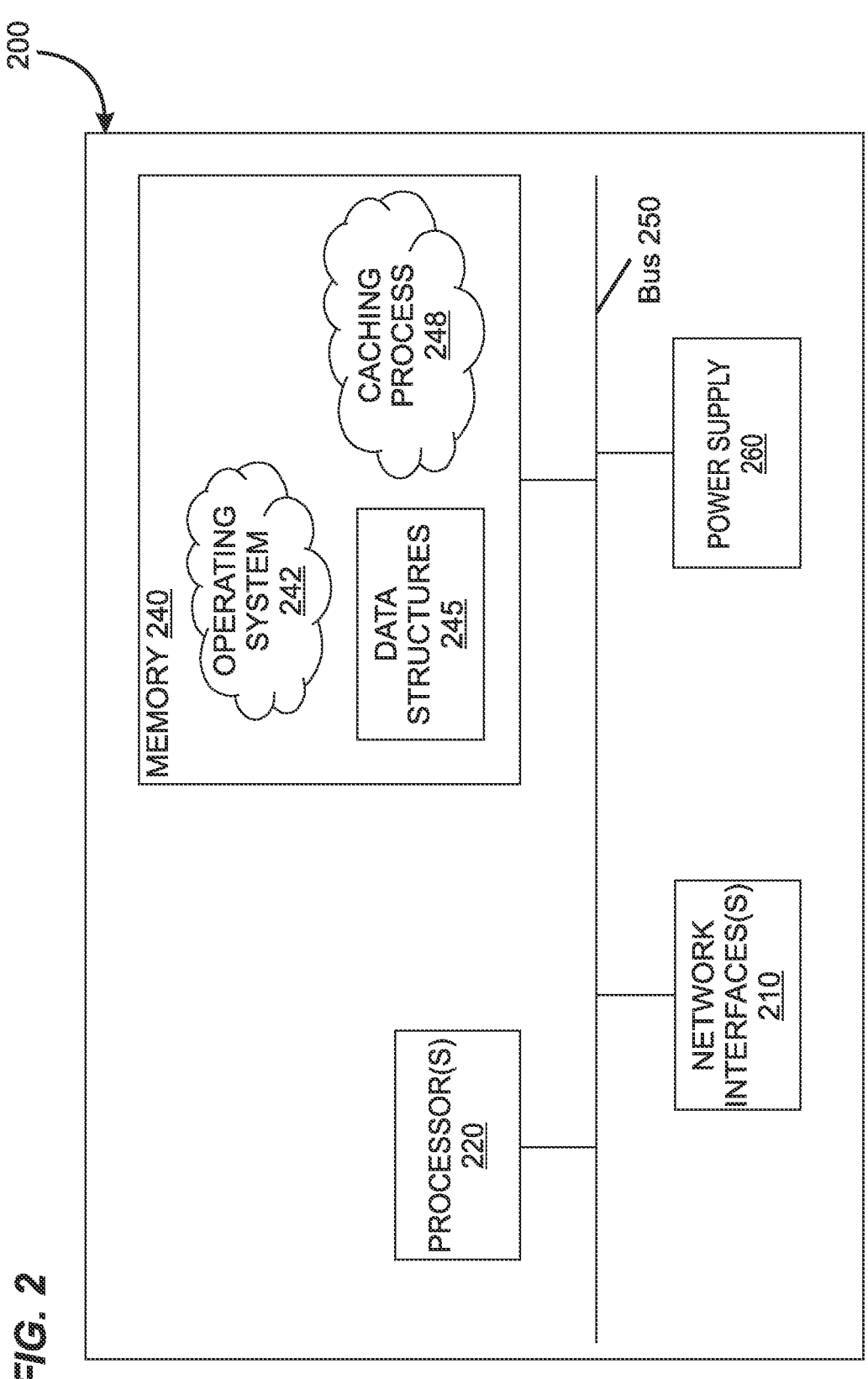
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components and/or services may comprise a caching process 248 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

In various implementations, as detailed further below, caching process 248 may include computer-executable instructions that, when executed by processor(s) 220, cause device 200 to perform the techniques described herein. To do so, in some implementations, caching process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, caching process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that caching process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, caching process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, caching process 248 may use a generative model to generate synthetic network traffic based on existing user traffic to test how the network reacts. Example generative approaches can include, but are not limited to, generative adversarial networks (GANs), large language models (LLMs), other transformer models, and the like.

——Generative AI Response Caching Using Prompt Processing Units——

As noted above, the inability of existing caching techniques to semantically understand the nature of the requests in an AI prompt and the tasks entailed and to implement effective caching techniques before those prompts are sent to and processed by external entities has rendered these techniques ineffective in intelligently deciding what prompts should be cached. Even minor syntactical variations to a prompt, such as adding a comma or a semicolon, may lead to cache misses or erroneous hits.

In contrast, the techniques described herein introduce a mechanism for generative AI response caching using PPUs. For example, these techniques introduce PPUs operable to characterize and distill key features from a prompt in a systematic manner. In addition, caching techniques are introduced that are configured to leverage these characterizations. More specifically, the techniques described herein may combine task breakdowns and quasi-idempotent functions, which may facilitate effective comparisons of semantic similarity and decisions made during cache lookups and the generation of new cache entries.

Indeed, these techniques may empower users (e.g., enterprises) to define, apply, and/or manage rules enabling caching controls working in tandem with a PPU, with focus on serving cached responses leveraging the characterization provided by a PPU. In addition, these techniques deliver an understanding of the effectiveness of caching techniques, including insights into which type of prompt responses are predominantly cached. These techniques may be applied at inference time and tested during few-shot prompting as well as during fine-tuning processes.

Illustratively, the techniques described herein may be performed by hardware, software, and/or firmware, such as in accordance with caching process 248, which may include computer executable instructions executed by the processor (s) 220 (or independent processor of the network interfaces 210) to perform functions relating to the techniques described herein. Further, they may be combined with post-processing methods to provide aggregated and/or historical visibility of prompt features and insights across an enterprise.

Specifically, according to various implementations, a device may provide a prompt to a large language model to perform a task. The device may determine a likelihood of an outcome of the task changing over a period of time. The device may store the prompt and the outcome in a cache when the likelihood indicates that the outcome of the task is unlikely to change over the period of time. The device may return the outcome from the cache in response to a subsequent prompt asking the large language model to perform the task, in lieu of providing the subsequent prompt to the large language model.

Figure 3:
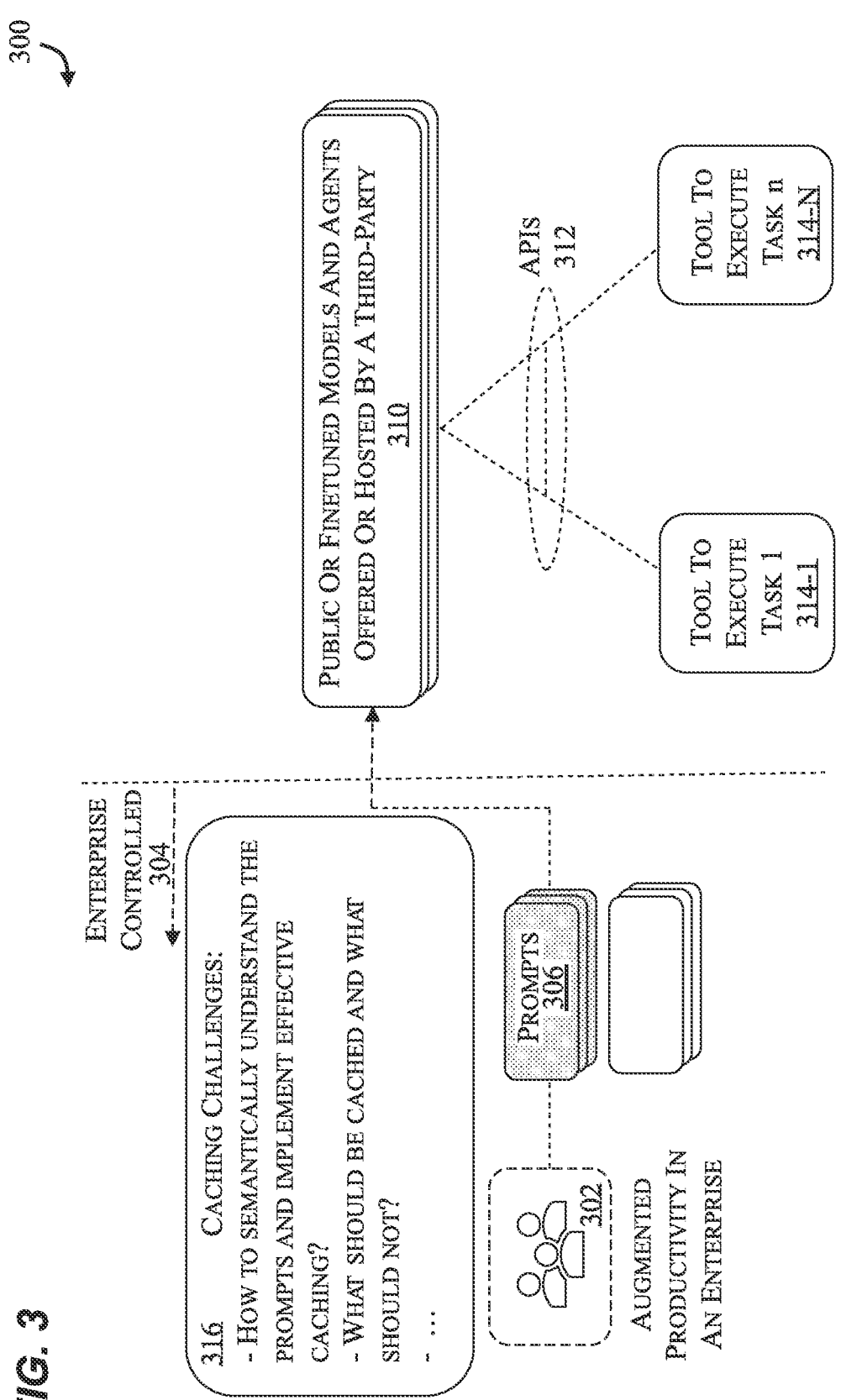
FIG. 3 illustrates an example of an environment for deploying prompt processing unit-based caching management.

Operationally, FIG. 3 illustrates an example of an environment 300 for deploying prompt processing unit-based caching management. In environment 300, the enterprise-controlled portion 304 may include the submission of prompts 306 (e.g., by a user chat interface or an API 302). The ability of users to submit these prompts 306 may augment organizational and/or personal productivity. For instance, sales, marketing, customer support, data analytics, engineering, product management, etc. may all utilize the prompts 306 to enhance their productivity.

Prompts 306 may be passed to a machine learning model 310 for processing and/or execution. Machine learning model 310 may be a generative AI model. In some instances, machine learning model 310 may include a public or fine-tuned model and/or agents offered or hosted by a third party. In addition, tools 314 (e.g., 314-1 . . . 314-N) for executing various tasks may be communicatively coupled (e.g., via APIs 312) to the machine learning model 310 and/or may be operable to participate in the execution of tasks specified in prompts 306.

Although many enterprises aim to leverage generative AI, they also want to minimize resource consumption. For example, users may wish to utilize a resource conservation mechanism such as caching, whenever possible, the responses received from the machine learning model 310. Consequently, while the prompts 306, user, and/or API 302 may be within the enterprise-controlled portion 304, an enterprise may be compelled to target additional understanding and implement caching controls, hence enabling them to address challenges 316 associated with caching. For instance, enterprises presently lack techniques to semantically understand the prompts and implement effective caching controls facilitating a determination as to what should be cached and what should not.

Machine learning model 310 and/or tools 314 may be equipped to "interpret" open-ended prompts and act upon them by generating artifacts or executing various tasks based on such "understanding". However, this skill is not accessible to an enterprise attempting to implement caching controls within the enterprise-controlled portion 304. This lack of understanding and natural-language native techniques hinders the possibility to observe and comprehend what are the tasks being requested in a prompt, or what sensitive data would be involved to complete such tasks, and thus, apply effective caching controls before the prompts 306 are processed by external entities.

However, these caching features may be enabled, and facilitated, within environment 300 using prompt processing units (PPUs). Hence, environment 300 may be modified by incorporating a caching system leveraging the prompt process of PPUs. For example, the PPUs may be utilized to parse a query and/or detect a set of key features from prompts 306 in a systematic manner. These characterizations may then be leveraged to empower intelligent response caching.

Figure 4:
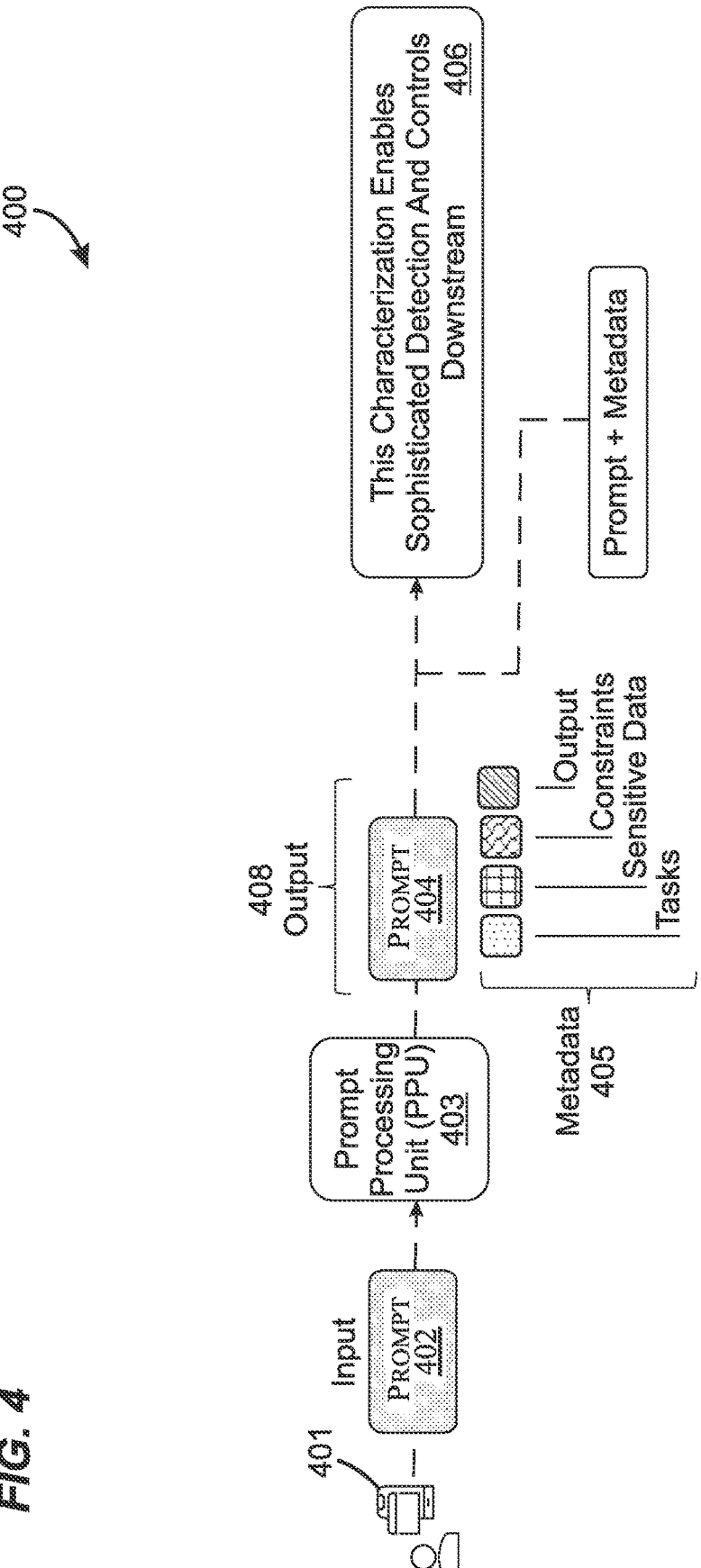
FIG. 4 illustrates an example of an architecture including a prompt processing unit configured to facilitate management of response caching.

FIG. 4 illustrates an example of an architecture 400 including a prompt processing unit (PPU 403) configured to facilitate management of response caching. Architecture 400 may be a portion of a data control system that leverages the outputs of the PPU 403 to institute sophisticated threat detection, downstream data controls, and/or response cache management.

PPU 403 may be a highly efficient processing element that may receive a prompt 402 as an input (e.g., from a user chat interface or an API 401). PPU 403 may parse the query and/or may detect a set of key features from the query. For instance, PPU 403 may detect key features within the prompt 402 such as the tasks requested, the sensitive data entailed to complete the tasks, any constraints applicable to complete the tasks, and/or the desired output upon completion of such tasks.

A PPU 403 may act as a transparent element, delivering the unmodified prompt 404 augmented with metadata 405 carrying the key features, such as those described above, as output 408. More specifically, a PPU 403 may systematically distill and characterize prompts, thereby enabling new and sophisticated controls downstream 406.

Figure 5:
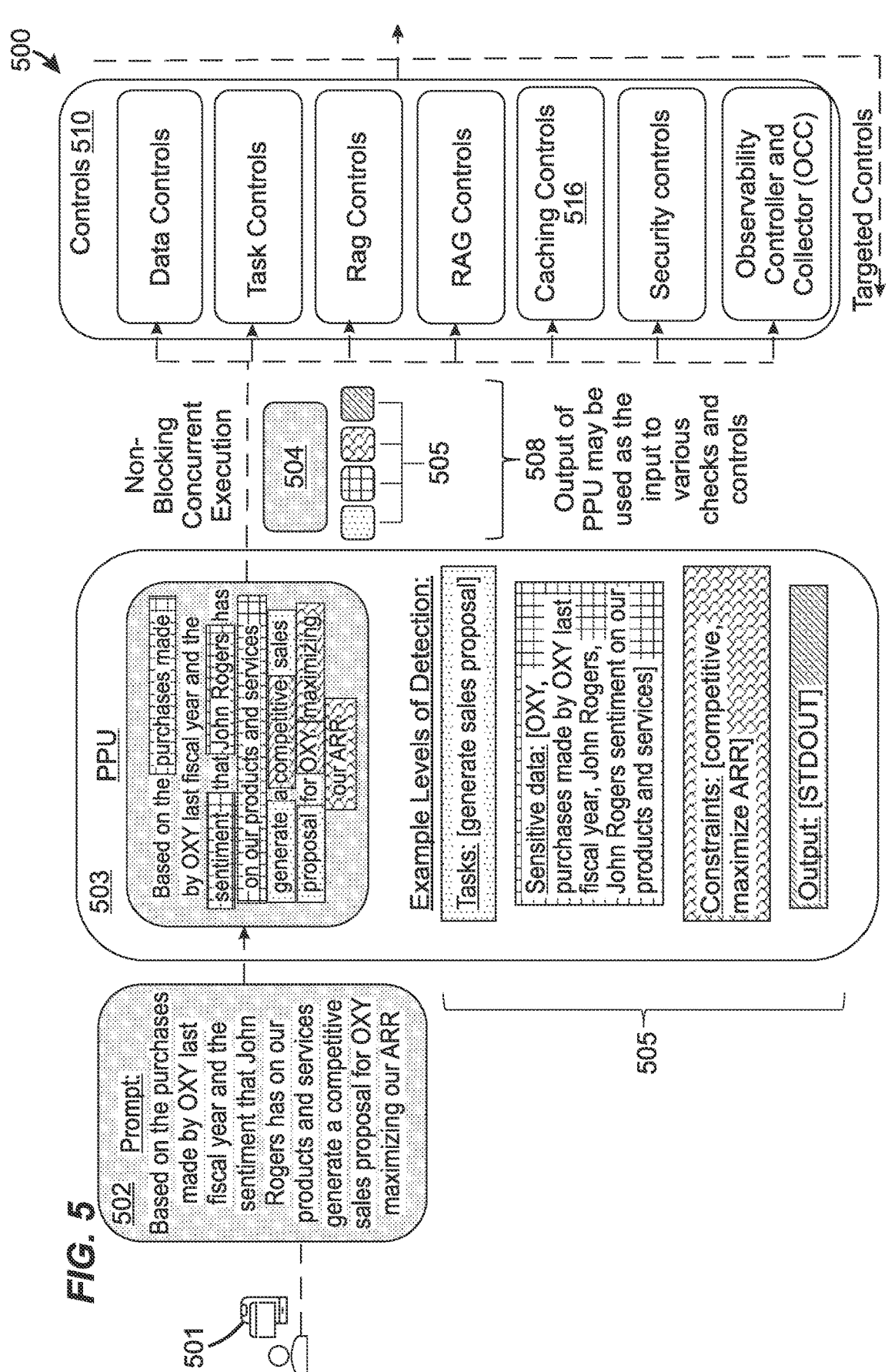
FIG. 5 illustrates an example of a caching system that leverages the outputs of PPUs.

FIG. 5 illustrates an example of a caching system 500 that leverages the outputs of PPUs. In caching system 500, an input prompt 502 (e.g., sent by a user in the sales department either using a chat interface or an API 501) may be processed by PPU 503. PPU 503 may detect key features in the input prompt 502 such as those outlined above. These features and/or other characterizing data may be packaged as metadata 505.

PPU 503 may generate an output 508 that makes available the output prompt 504 along with the prompt characterization (e.g., metadata 505) to various processes downstream. In various implementations, PPU 503 may fan-out the prompt and the corresponding metadata (e.g., output 508) to various controls (e.g., controls 510). These controls 510 may process the output of PPU 503 concurrently and in a non-blocking manner before the prompt is sent to any external entity. One such example of controls 510 includes caching controls 516, which may be applied before input prompt 502/output prompt 504 is processed by external entities.

Figure 6A:
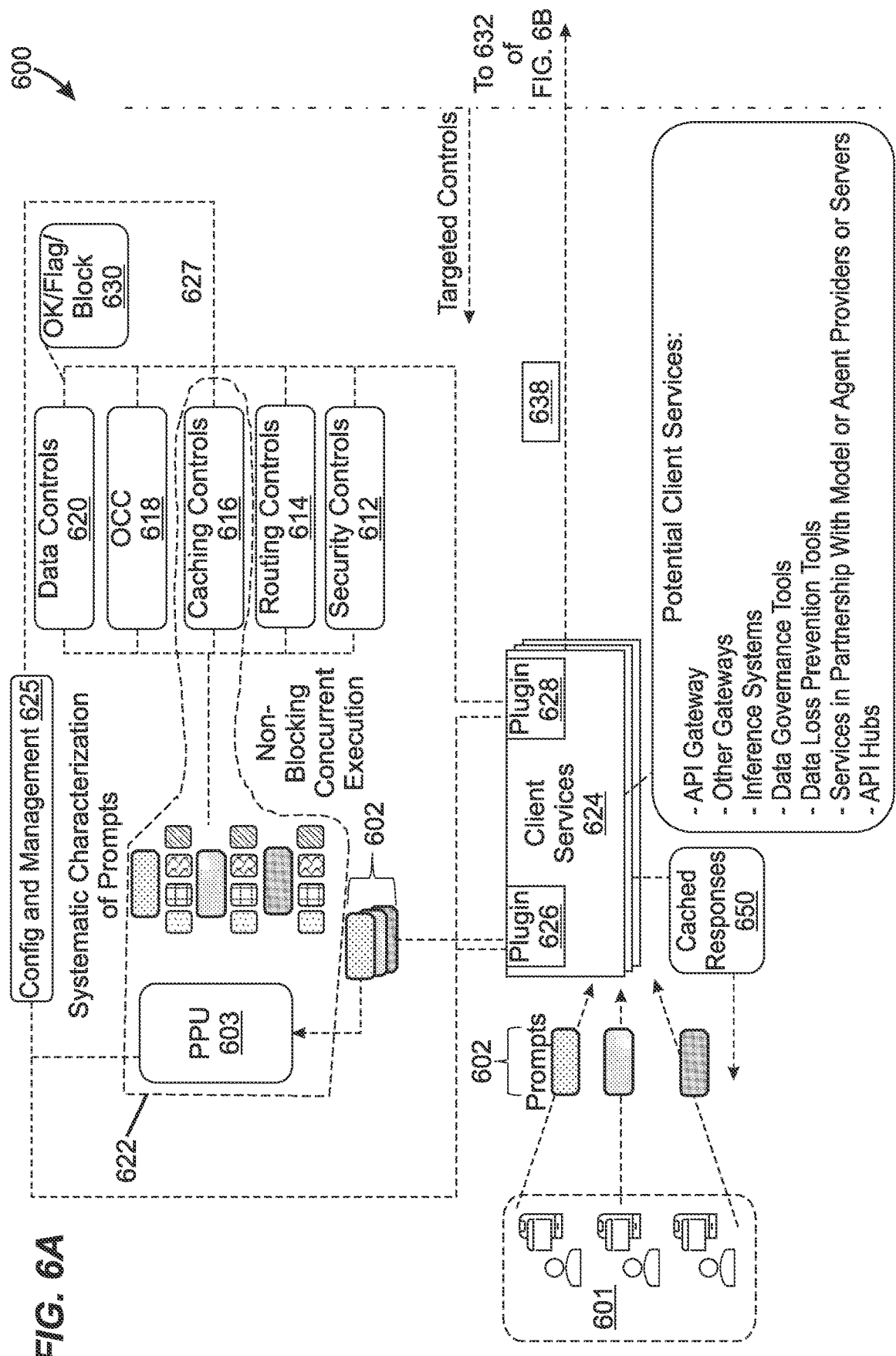
FIGS. 6A-6B illustrate an example of a caching management system configured for controlling caching with multi-prompt processing and/or multi-model or agent distribution.
Figures 6A, 6B:
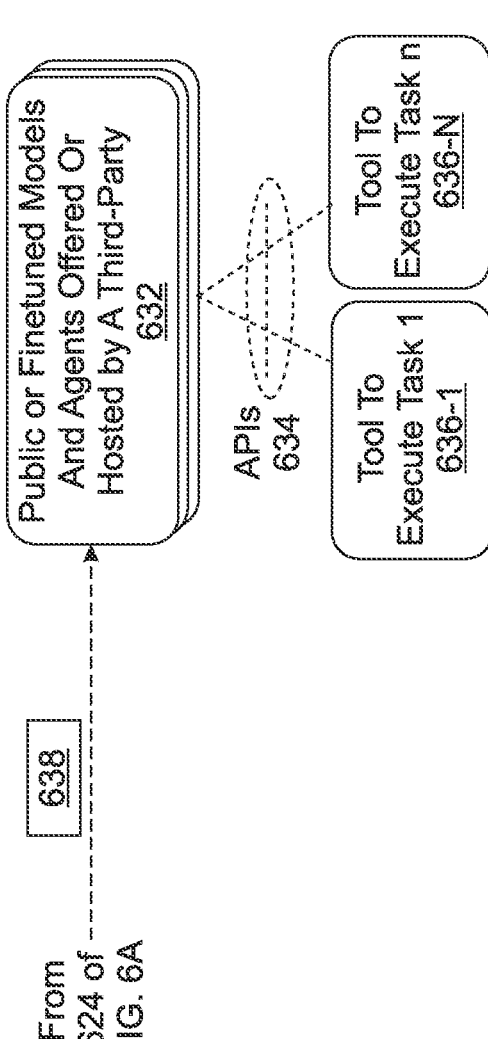

FIGS. 6A-6B illustrate an example of a caching management system 600 configured for controlling caching with multi-prompt processing and/or multi-model or agent distribution. For example, caching management system 600 may be configured to manage caching of responses to prompts across various users and/or APIs 601 sending prompts 602 to potentially different models and/or agents offered or hosted by third parties 632.

Various methods may be used to retain and/or exercise control before the prompts are sent to external entities. For example, an intermediate layer of control may be utilized, such as an API Gateway, other gateways, an inference system, a data governance tool, a data loss prevention (DLP) tool, a service in partnership with model or agent providers or servers, an API Hub, etc. Any of these intermediate elements of control may act as a client service 624 working in concert with element 622, which may comprise PPU 603 and caching controls 616 working in tandem.

PPU 603 may interface with client service 624 through plugin 626, which may be used to efficiently redirect the prompts to PPU 603 along with additional metadata. Such metadata may comprise the user ID, the tenant ID, and the App ID (e.g., identified through the API key used) associated to the various users of client service 624. In some implementations, such metadata might be sent by client service 624 directly to the corresponding controllers, e.g., data controls 620, observability controller and collector (OCC 618), caching controls 616, routing controls 614, or security controls 612, thereby bypassing PPU 603.

A configuration and management module 625 may manage configuration and management of plugins (e.g., plugin 626 and plugin 628), PPU 603, and/or caching controls 616 via interface 627. Such configuration may define caching controls 616 as a subscriber of PPU 603 (e.g., on the left hand-side) as well as a publisher to observability controller and collector (OCC 618) and plugin 628 (e.g., on the right hand-side).

This may enable OCC 618 to not only provide visibility of a hit in the cache and that a cached response will be returned, but also to collect data and gain insights into the effectiveness of caching techniques. This may include insights into which type of prompt responses are predominantly cached. Indeed, the processing made by caching controls 616 may result in the caching of prompt responses, and serving cached responses 650 via client service 624, to the users and/or processes (e.g., via APIs 601) that issued the queries.

In various implementations, configuration and management module 625 may also configure other listeners to caching controls 616, such as data controls 620, routing controls 614, or security controls 612, to either trigger or override the outcome of certain controls depending on whether there is a hit or miss in the cache. In another implementation, one or more plugins (e.g., plugin 626) may be used, e.g., to handle various PPUs (e.g., PPU 603) concurrently and potentially distribute the load across users, tenants, and/or applications, and/or to ensure isolation among them.

Alternatively, or additionally, the PPUs might be specialized elements, which may distill different properties from a prompt depending on the use case. Hence, various plugins (e.g., plugin 626) may be used to segment and redirect prompts to the correct PPUs. In addition, plugins (e.g., plugin 628) may support means to indicate the need to reengineer the prompt, block it, and/or send feedback about the result to the corresponding user or process that issued the prompt.

The prompts for which there is a cache miss, and that successfully passed the checks and various controls, may be sent (e.g., at box 638) to the various public or finetuned models and/or agents offered or hosted by third parties 632. As illustrated in FIGS. 6A-6B, such models may be part of larger systems, which may use various APIs 634 and tools 636 (636-1 . . . 636-N) to orchestrate, execute, and chain various tasks before responding to a query carried in a prompt.

Figure 7A:
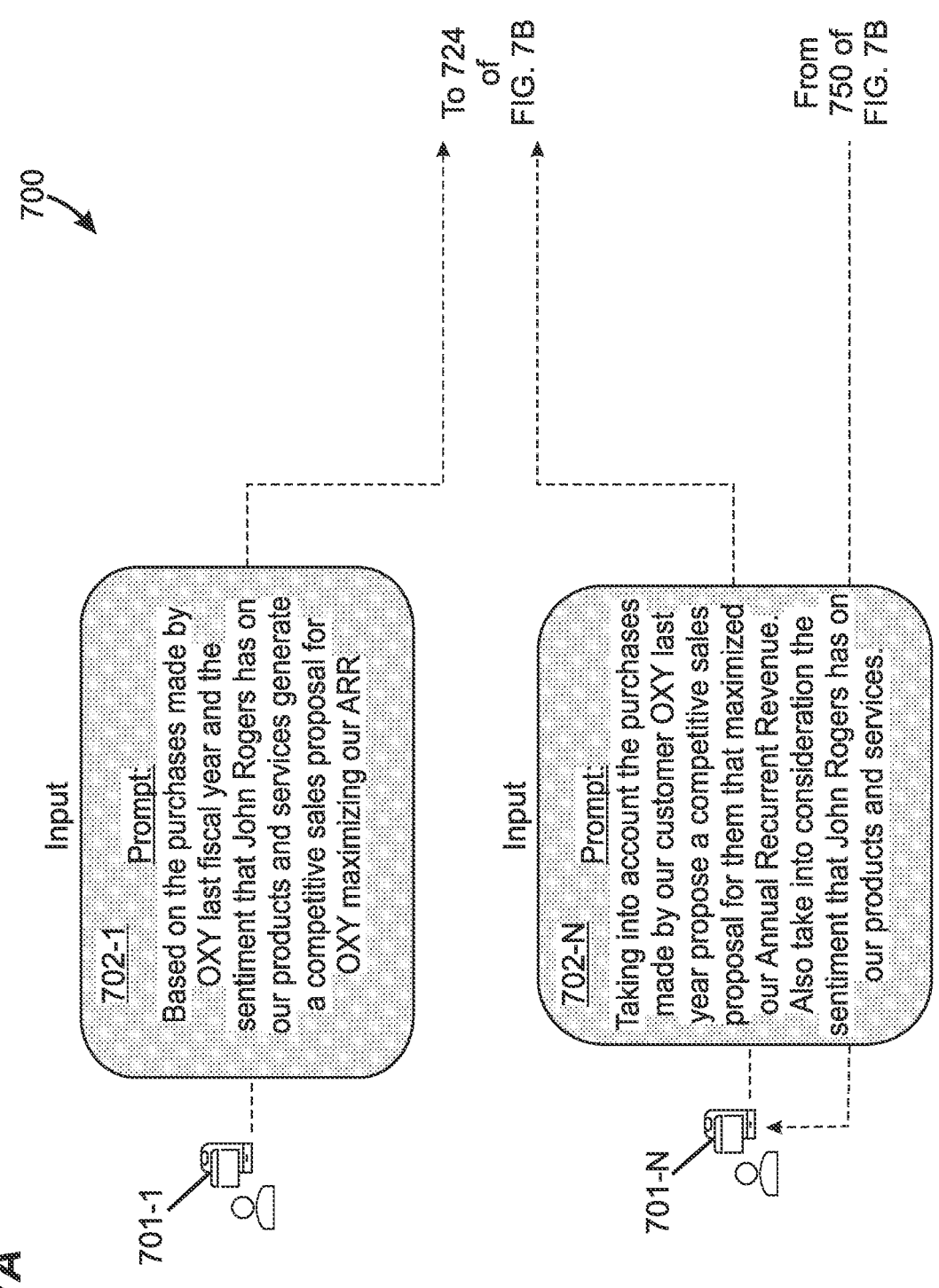
Figure 7B:
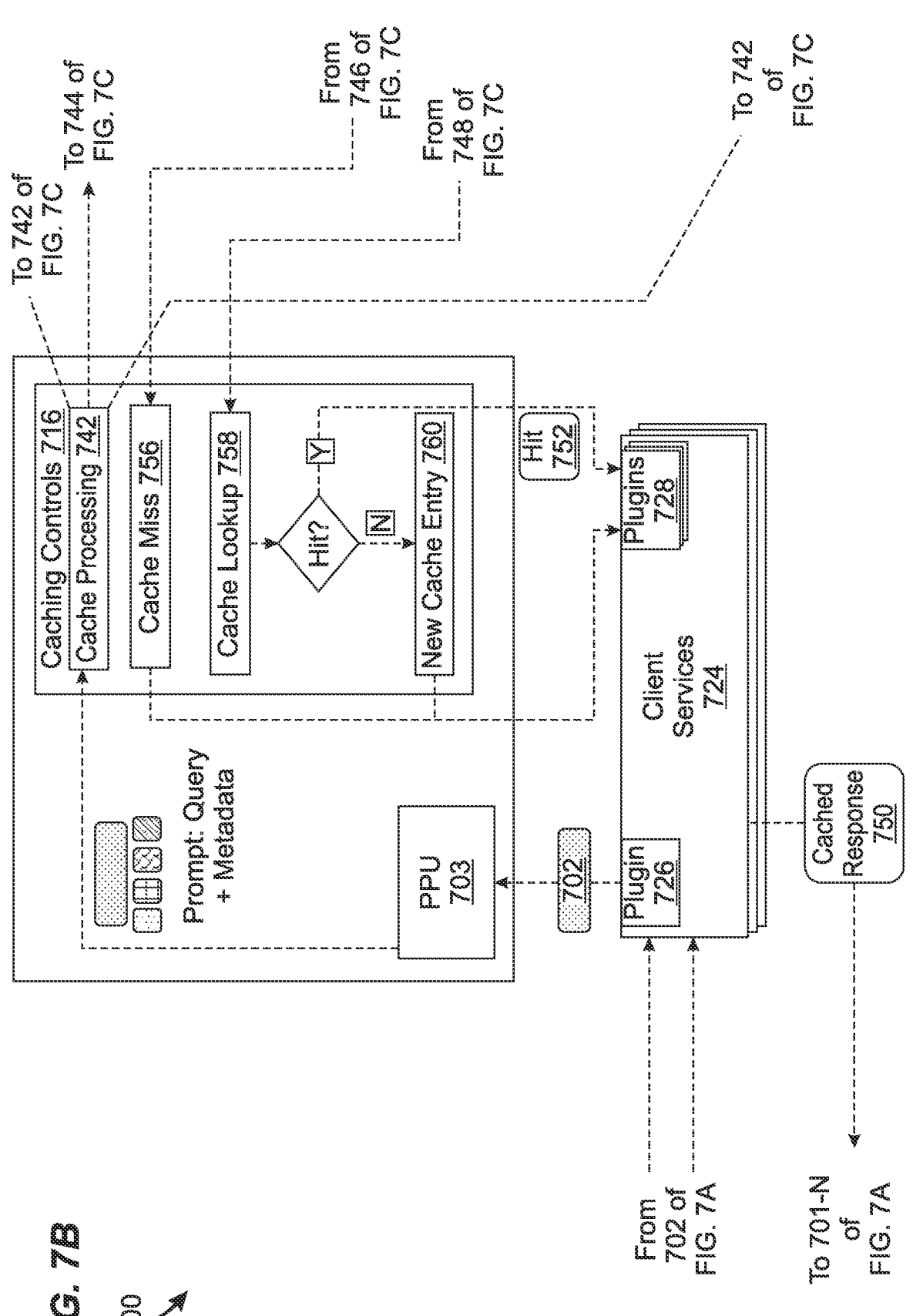

FIGS. 7A-7C illustrate an example of a caching management system 700 configured to leverage prompt characterizations generated by PPU 703 to manage response caching. In caching management system 700, an input prompt 702 (e.g., 702-1 . . . 702-N) (e.g., sent by a user in the sales department either using a chat interface or an API 701 (e.g., 701-1 . . . 701-N)) may be received at client service 724. The input prompt 702 may be sent to PPU 703 through plugin 726. PPU 703 may make the prompt characterization available to caching controls 716.

In various implementations, a cache processing module 742 may be utilized within caching controls 716. At box 744, a characterization of the input prompt 702 may be supplied by PPU 703 to cache processing module 742. Cache processing module 742 may parse the characterization supplied by PPU 703 and further breakdown the request into smaller tasks (e.g., breakdown 754). In contrast to agents that execute the various tasks after the breakdown, cache processing module 742 does not execute any of such tasks. Instead, it may use the breakdown 754 to determine whether the prompt response should be cached or not.

Cache processing module 742 may be trained or fine-tuned to acquire the specific skill of identifying whether each of the various tasks listed in the breakdown can be solved using a quasi-idempotent function. The term quasi-idempotent may indicate that the function that may solve the task is either idempotent, or in practical terms, it can be considered idempotent in timescales that are practically relevant for caching.

For instance, "Task 3: Get current Product Catalog" in the breakdown 754 can be solved through a function that is not idempotent. That is, the output of a function that searches, retrieves, and returns the desired information may vary over time. However, the output might be categorized as quasi-idempotent since the frequency of variation in the responses is expected to be negligible compared to the lifespan of the entries in a cache. This capability may be trained and acquired in different ways. For instance, it may be supported by model-based characterization and Reinforcement Learning with Human Feedback (RLHF).

In order to determine whether the prompt response should be cached or not, cache processing module 742 may assess whether each task in the breakdown 754 qualifies as solvable through a quasi-idempotent function. In case any of these tasks (e.g., functions) fail to satisfy the quasi-idempotent property, cache processing module 742 may notify, at box 746, a non-cacheable result, which may lead to a cache miss 756, and hence, to follow the normal flow by forwarding the prompt to external models and/or agents for standard processing.

Instead, if all the tasks (e.g., functions) satisfy the quasi-idempotent property, cache processing module 742 may proceed, for example, to convert each task in the breakdown to a nominal task format, such as inputs, single action, output, etc. Cache processing module 742 may tokenize each task using a nominal task format, "OR" the result, and/or utilize the outcome as an identifier to index cache entries.

Hence, when the tasks requested are semantically the same, but, e.g., they are expressed differently and/or listed in a different order (see, e.g., input prompt 702-N sent by user or process (e.g., via API 701-N), the tokenization of tasks in nominal task format and subsequent "OR-ing" of the result may lead to the same output even when the task breakdown is sorted differently, or whether there are subtle variances in the expression of the tasks before being converted to a nominal format.

In instances where the result can be cached, a cacheable result might be available as an outcome from cache processing module 742 in box 748. This may drive a cache lookup 758, which in turn may lead to a cache hit 752 or a new cache entry 760. For instance, if input prompt 702-1 reaches client service 724 before input prompt 702-N, then the response for input prompt 701-2 may generate a new cache entry 760, while the response for input prompt 702-N may yield a cache hit 752. More specifically, in this example, the flow for input prompt 702-1 may follow the standard path and may be sent to the external models or agents chosen, while the corresponding response to input prompt 702-N may be cached as a new entry (e.g., the cache itself may be either hosted by client services 724 or connected to the latter). However, input prompt 702-N may yield a cache hit 752, which may be notified by caching controls 716 to client services 724, via plugin 728, and the cached response 750 may be sent back (e.g., to the requesting user via API 701-N) as a response to input prompt 702-N.

Those skilled in the art will appreciate that these are not-limiting examples, and other possible techniques and/or implementations may apply as well. Moreover, the objective of this technique may not be to run a very large model to perform caching, with the aim of avoiding running the prompt through another very large model. The cache processing module 742 may be targeted toward the functionality described herein. With this focus, this module does not need to generate poetry, write code, perform mathematical calculus, process images, or support multi-modal inputs. Indeed, it does not even need to execute any of the tasks in the breakdown 754. Consequently, in practical terms, it may be a specifically trained element devoted only to caching.

FIG. 8 illustrates an example of a simplified procedure for generative AI response caching using PPUs in accordance with one or more implementations described herein. For example, a non-generic, specifically configured device (e.g., device 200) may perform procedure 800 by executing stored instructions (e.g., caching process 248).

The procedure 800 may start at step 805, and continues to step 810, where, as described in greater detail above, a device may provide a prompt to a large language model to perform a task. In some instances, this prompt may be provided, controlled, and/or retained at an intermediary layer between a user that submitted the prompt/an API across which the prompt was initially submitted, and an LLM associated with a third-party entity. The prompt may be controlled and/or retained within this intermediary layer until the various caching determinations described herein are completed. This may mean that a prompt may not be submitted to the LLM for processing until after the caching determinations have been made. In some instances (e.g., a cacheable result produces a cache hit and the corresponding cached outcome is provided as a response to the prompt in lieu of submitting the prompt to the LLM for processing) the prompt may not be submitted to the LLM for processing at all.

The prompt may be parsed to generate a prompt characterization. The prompt characterization may include a characterization of tasks requested in the prompt, sensitive data entailed in completing the tasks, a constraint applicable to completing the tasks, and/or a targeted output upon completion of the tasks. In various implementations, this characterization may be parsed to generate a breakdown of the tasks included in the prompt.

At step 815, as detailed above, the device may determine a likelihood of an outcome of the task changing over a period of time. The period of time may correspond to a phase out time for entries stored in a cache. The likelihood of the outcome of the task changing over the period of time may be determined based on a determination of whether the task qualifies as solvable through a quasi-idempotent function. This determination may be made upon each task in the breakdown of the tasks included in the prompt. In various implementations, the prompt may be provided to the LLM without storing the prompt and the outcome in the cache when the likelihood indicates that the outcome of the task is likely to change over the period of time (e.g., the outcome of processing of the task by the LLM is a non-cacheable result).

At step 820, the device may store the prompt and the outcome in a cache when the likelihood indicates that the outcome of the task is unlikely to change over the period of time (e.g., the outcome of processing of the task by the LLM is a cacheable result). In some instances, the determination of whether an outcome is a cacheable result, or a non-cacheable result may involve further processing of the tasks from the breakdown. For instance, each of the tasks in the breakdown may be tokenized in a nominal task format and OR-ed.

In various implementations, the outcome may be stored in the cache responsive to determining, by a cache lookup operation, that the outcome is not already stored in the cache (e.g., a cacheable response that does not yield a hit in the cache). Cache entries may be indexed utilizing task outcomes as entry identifiers. These may be referenced in cache lookup operations.

As detailed above, at step 825, the device may return the outcome from the cache in response to a subsequent prompt asking the large language model to perform the task. This returning of the cached response may be conducted in lieu of providing the subsequent prompt to the large language model. A determination may be made by the device as to whether the subsequent prompt is asking the large language model to perform the task by performing a cache lookup operation for a cacheable task included in the subsequent prompt. That is, a task included in the subsequent prompt and/or its potential outcome, deemed by the device to be cacheable, may be referenced against the prompts, tasks, outcomes, etc. already stored in the cache to identify a corresponding pre-cached result that would satisfy the intent of the subsequent prompt without involving processing of the subsequent prompt by the LLM.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, facilitate enterprises in leveraging generative AI while reducing resource demands associated therewith. Specifically, these techniques introduce a mechanism to manage caching of some of the responses received from external models and/or agents, since the resource demands of using generative AI can be very high. These techniques deliver an ability to intelligently cache prompt responses not achievable with conventional caching techniques, which are ineffective in determining which prompts should be cached and which should not be in the absence of an ability to semantically understand the nature of the requests included in a prompt and the tasks entailed.

Specifically, the techniques described herein introduce prompt processing units (PPUs) which facilitate characterization and distillation of key features from a prompt in a systematic manner. Caching techniques are introduced based on such characterizations. More specifically, the techniques described herein combine intelligent task breakdowns and quasi-idempotent functions, which may enable more effective comparisons of semantic similarity and decisions made during cache lookups and the generation of new cache entries. Indeed, the techniques described herein may facilitate a user/enterprise in defining, applying, and managing rules enabling caching controls to work in tandem with a PPU, with focus on serving cached responses leveraging the characterization provided by a PPU. Additionally, the techniques described herein may empower a user/enterprise with an understanding of the effectiveness of caching techniques, including by delivering insights into which type of prompt responses are mostly cached. These techniques may be applied at inference time and tested during few-shot prompting as well as during fine-tuning processes.

While there have been shown and described illustrative implementations that provide for generative AI response caching using prompt processing units, it is to be understood that various other adaptations and modifications may be made within the spirit and scope of the implementations herein. For example, while certain implementations are described herein with respect to using certain elements, modules, components, architectures, etc. for the purposes of managing caching, the elements, modules, components, architectures, etc. are not limited as such and may be used for other functions, in other arrangements, in other functional distributions, in other implementations, etc. In addition, while certain types of metadata and data types/categories such as tasks, sensitive data, constraints, and outputs are shown, other suitable metadata and data types/categories may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as tangible, non-transitory, computer-readable medium having computer-executable instructions stored thereon that, when executed by a processor on a computer, cause the computer to perform a method. For example, the components and/or elements may be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
   providing, by a device, a prompt to a large language model to perform a task;
   determining, by the device and using a generative artificial intelligence model trained to identify whether one or more tasks in received prompts can be solved using a quasi-idempotent function without executing the one or more tasks, a likelihood of an outcome of the task changing over a period of time based on whether the task qualifies as solvable through the quasi-idempotent function without requiring execution of the task;
   storing, by the device, the prompt and the outcome in a cache when the likelihood indicates that the outcome of the task is unlikely to change over the period of time; and returning, by the device, the outcome from the cache in response to a subsequent prompt asking the large language model to perform the task, in lieu of providing the subsequent prompt to the large language model.

2. The method of claim 1, further comprising:
providing the prompt to the large language model without storing the prompt and the outcome in the cache when the likelihood indicates that the outcome of the task is likely to change over the period of time.

3. The method of claim 1, wherein the outcome is stored in the cache responsive to determining, by a cache lookup operation, that the outcome is not already stored in the cache.

4. The method of claim 1, further comprising:
determining whether the subsequent prompt is asking the large language model to perform the task by performing a cache lookup operation for a cacheable task included in the subsequent prompt.

5. The method of claim 1, wherein the period of time corresponds to a phase out time for entries in the cache.

6. The method of claim 1, further comprising:
parsing a characterization of the prompt to generate a breakdown of tasks included in the prompt.

7. The method of claim 6, further comprising:
tokenizing each of the tasks in the breakdown in a nominal task format; and
OR-ing tokenized tasks from the breakdown.

8. The method of claim 1, further comprising:
indexing cache entries utilizing task outcomes as entry identifiers.

9. The method of claim 1, further comprising:
parsing the prompt to generate a prompt characterization, wherein the prompt characterization includes one or more of tasks requested in the prompt, sensitive data entailed in completing the tasks, a constraint applicable to completing the tasks, or a targeted output upon completion of the tasks.

10. An apparatus, comprising:
one or more network interfaces to communicate with a network;
a processor coupled to the one or more network interfaces and configured to execute one or more processes; and
a memory configured to store a process that is executable by the processor, the process, when executed, configured to:
provide a prompt to a large language model to perform a task;
determine, using a generative artificial intelligence model trained to identify whether one or more tasks in received prompts can be solved using a quasi-idempotent function without executing the one or more tasks, a likelihood of an outcome of the task changing over a period of time based on whether the task qualifies as solvable through the quasi-idempotent function without requiring execution of the task;
store the prompt and the outcome in a cache when the likelihood indicates that the outcome of the task is unlikely to change over the period of time; and
return the outcome from the cache in response to a subsequent prompt asking the large language model to perform the task, in lieu of providing the subsequent prompt to the large language model.

11. The apparatus as in claim 10, the process further configured to:
provide the prompt to the large language model without storing the prompt and the outcome in the cache when the likelihood indicates that the outcome of the task is likely to change over the period of time.

12. The apparatus as in claim 10, wherein the outcome is stored in the cache responsive to determining, by a cache lookup operation, that the outcome is not already stored in the cache.

13. The apparatus as in claim 10, the process further configured to:
determine whether the subsequent prompt is asking the large language model to perform the task by performing a cache lookup operation for a cacheable task included in the subsequent prompt.

14. The apparatus as in claim 10, wherein the period of time corresponds to a phase out time for entries in the cache.

15. The apparatus as in claim 10, the process further configured to:
parse a characterization of the prompt to generate a breakdown of tasks included in the prompt.

16. The apparatus as in claim 15, the process further configured to:
tokenize each of the tasks in the breakdown in a nominal task format; and
OR tokenized tasks from the breakdown.

17. The apparatus as in claim 10, the process further configured to:
index cache entries utilizing task outcomes as entry identifiers.

18. A tangible, non-transitory, computer-readable medium having computer-executable instructions stored thereon that, when executed by a processor on a computer, cause the computer to perform a method comprising:
providing a prompt to a large language model to perform a task;
determining, using a generative artificial intelligence model trained to identify whether one or more tasks in received prompts can be solved using a quasi-idempotent function without executing the one or more tasks, a likelihood of an outcome of the task changing over a period of time based on whether the task qualifies as solvable through the quasi-idempotent function without requiring execution of the task;
storing the prompt and the outcome in a cache when the likelihood indicates that the outcome of the task is unlikely to change over the period of time; and
returning the outcome from the cache in response to a subsequent prompt asking the large language model to perform the task, in lieu of providing the subsequent prompt to the large language model.

19. The method as in claim 1, wherein:
determining the likelihood of the outcome of the task changing over the period of time comprises parsing a characterization of the prompt to generate a breakdown of tasks included in the prompt;
storing the prompt and the outcome in the cache comprises indexing the prompt and the outcome to enable retrieval for subsequent tasks that are semantically the same but expressed differently or listed in a different order by:
tokenizing the tasks in the breakdown in a nominal task format;
generating task outcomes by OR-ing tokenized tasks from the breakdown; and
indexing cache entries utilizing the task outcomes as entry identifiers.

20. The method as in claim 1, wherein determining the likelihood of the outcome of the task changing over the period of time comprises:

parsing a characterization of the prompt to generate a breakdown of tasks included in the prompt; and evaluating, without executing the tasks, whether each task in the breakdown qualifies as solvable through the quasi-idempotent function.

* * * * *